United States Patent
Gupta et al.

(10) Patent No.: US 11,468,673 B2
(45) Date of Patent: Oct. 11, 2022

(54) AUGMENTED REALITY SYSTEM USING STRUCTURED LIGHT

(71) Applicant: Snap Inc., Santa Monica, CA (US)

(72) Inventors: Mohit Gupta, Madison, WI (US); Shree K. Nayar, New York, NY (US); Vishwanath Saragadam Raja Venkata, Pittsburgh, PA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/248,036

(22) Filed: Jan. 6, 2021

(65) Prior Publication Data

US 2021/0201036 A1 Jul. 1, 2021

Related U.S. Application Data

(63) Continuation of application No. 16/112,308, filed on Aug. 24, 2018, now Pat. No. 10,909,373.

(51) Int. Cl.
*G06K 9/00* (2022.01)
*G06T 19/00* (2011.01)
*G06T 17/05* (2011.01)
*G06T 7/586* (2017.01)
*G06T 15/08* (2011.01)
*G06V 20/20* (2022.01)

(52) U.S. Cl.
CPC .............. *G06V 20/20* (2022.01); *G06T 7/586* (2017.01); *G06T 15/08* (2013.01); *G06T 17/05* (2013.01); *G06T 19/006* (2013.01)

(58) Field of Classification Search
CPC combination set(s) only.
See application file for complete search history.

(56) References Cited

U.S. PATENT DOCUMENTS

| | | | |
|---|---|---|---|
| 6,523,955 B1 | 2/2003 | Eberl et al. | |
| 7,015,926 B2 | 3/2006 | Zitnick, III et al. | |
| 7,440,590 B1 | 10/2008 | Hassebrook et al. | |
| 8,538,166 B2 * | 9/2013 | Gordon | G01B 11/25 382/201 |
| 8,845,107 B1 | 9/2014 | Coley | |
| 9,047,698 B2 | 6/2015 | Maciocci et al. | |
| 9,131,223 B1 * | 9/2015 | Rangarajan | H04N 13/254 |

(Continued)

OTHER PUBLICATIONS

"U.S. Appl. No. 15/453,100, Notice of Allowance dated Sep. 30, 2020", 8 pgs.

(Continued)

*Primary Examiner* — Motilewa Good-Johnson
(74) *Attorney, Agent, or Firm* — Schwegman Lundberg & Woessner, P.A.

(57) ABSTRACT

An augmented reality system having a light source and a camera. The light source projects a pattern of light onto a scene, the pattern being periodic. The camera captures an image of the scene including the projected pattern. A projector pixel of the projected pattern corresponding to an image pixel of the captured image is determined. A disparity of each correspondence is determined, the disparity being an amount that corresponding pixels are displaced between the projected pattern and the captured image. A three-dimensional computer model of the scene is generated based on the disparity. A virtual object in the scene is rendered based on the three-dimensional computer model.

20 Claims, 13 Drawing Sheets

(56) References Cited

U.S. PATENT DOCUMENTS

| | | | |
|---|---|---|---|
| 9,503,684 | B2 | 11/2016 | Basso et al. |
| 9,721,386 | B1* | 8/2017 | Worley, III ........... G06F 9/5066 |
| 9,766,057 | B1* | 9/2017 | Coley ................. G01B 11/022 |
| 9,858,703 | B2 | 1/2018 | Kaminitz et al. |
| 9,947,098 | B2* | 4/2018 | Romano ................ G06T 15/50 |
| 10,109,107 | B2* | 10/2018 | Knorr ................... G06T 15/50 |
| 10,417,786 | B2 | 9/2019 | Gordon et al. |
| 10,453,185 | B2* | 10/2019 | Dal Mutto ........... H04N 13/254 |
| 10,481,740 | B2 | 11/2019 | Cutu et al. |
| 10,551,913 | B2* | 2/2020 | McCombe ............. G06T 11/00 |
| 10,628,996 | B2 | 4/2020 | Kass |
| 10,733,804 | B2 | 8/2020 | Knorr et al. |
| 10,909,373 | B1 | 2/2021 | Gupta et al. |
| 10,930,059 | B2* | 2/2021 | Jiddi ................. G06T 15/506 |
| 10,931,935 | B2* | 2/2021 | Xiao ................... G02B 27/0961 |
| 11,057,608 | B2* | 7/2021 | Nash ................... H04N 13/271 |
| 2004/0105580 | A1 | 6/2004 | Hager et al. |
| 2006/0028489 | A1 | 2/2006 | Uyttendaele et al. |
| 2006/0146560 | A1* | 7/2006 | Lewin ................... G01B 11/25 |
| | | | 362/560 |
| 2006/0210146 | A1 | 9/2006 | Gu |
| 2008/0118143 | A1* | 5/2008 | Gordon ................. G06T 7/521 |
| | | | 382/154 |
| 2008/0201101 | A1* | 8/2008 | Hebert ............... G01B 11/2513 |
| | | | 702/152 |
| 2008/0266294 | A1 | 10/2008 | Osman |
| 2009/0077504 | A1 | 3/2009 | Bell et al. |
| 2009/0322745 | A1* | 12/2009 | Zhang ................... G06T 7/521 |
| | | | 345/420 |
| 2010/0034457 | A1* | 2/2010 | Berliner ............. G06K 9/00362 |
| | | | 382/154 |
| 2010/0074532 | A1 | 3/2010 | Gordon et al. |
| 2011/0273443 | A1 | 11/2011 | Ernst et al. |
| 2011/0292044 | A1 | 12/2011 | Kim et al. |
| 2012/0127284 | A1 | 5/2012 | Bar-Zeev et al. |
| 2012/0262553 | A1* | 10/2012 | Chen ................... H04N 13/111 |
| | | | 348/47 |
| 2013/0088726 | A1 | 4/2013 | Goyal et al. |
| 2013/0166256 | A1 | 4/2013 | Kirk et al. |
| 2014/0320530 | A1 | 10/2014 | Gruber, Jr. et al. |
| 2015/0022644 | A1 | 1/2015 | Appia |
| 2015/0022693 | A1 | 1/2015 | Appia et al. |
| 2015/0208059 | A1 | 7/2015 | Hassebrook et al. |
| 2015/0243035 | A1* | 8/2015 | Narasimha ............. G06T 7/344 |
| | | | 382/154 |
| 2015/0302594 | A1* | 10/2015 | Moore ................... G01B 11/25 |
| | | | 348/47 |
| 2015/0339857 | A1 | 11/2015 | Oconnor et al. |
| 2015/0381971 | A1 | 12/2015 | Wu |
| 2016/0034771 | A1* | 2/2016 | Schamp ............... B60G 17/019 |
| | | | 348/148 |
| 2016/0050401 | A1* | 2/2016 | Gordon ............. G01B 11/2513 |
| | | | 348/744 |
| 2016/0182889 | A1* | 6/2016 | Olmstead ............... H04N 19/17 |
| | | | 348/47 |
| 2017/0059305 | A1* | 3/2017 | Nonn ................. G01B 11/2513 |
| 2018/0020195 | A1* | 1/2018 | Lindner .................. G06T 11/20 |
| 2018/0048880 | A1 | 2/2018 | Trail et al. |
| 2018/0157342 | A1 | 6/2018 | Romano et al. |
| 2018/0204329 | A1 | 7/2018 | Cutu et al. |
| 2018/0307310 | A1* | 10/2018 | McCombe ............. G06V 20/13 |
| 2018/0321384 | A1 | 11/2018 | Lindner et al. |
| 2019/0101377 | A1 | 4/2019 | White et al. |
| 2019/0130590 | A1 | 5/2019 | Volochniuk et al. |
| 2019/0167093 | A1* | 6/2019 | Breuninger ............ A61B 3/103 |
| 2020/0041258 | A1* | 2/2020 | Wang ..................... G06T 7/521 |
| 2022/0113131 | A1* | 4/2022 | Takagi ..................... G01C 3/06 |

OTHER PUBLICATIONS

"U.S. Appl. No. 16/112,308, Final Office Action dated Apr. 20, 2020", 16 pgs.

"U.S. Appl. No. 16/112,308, Non Final Office Action dated Sep. 6, 2019", 14 pgs.

"U.S. Appl. No. 16/112,308, Response filed Feb. 4, 20 to Non Final Office Action dated Sep. 6, 2019", 8 pgs.

"U.S. Appl. No. 16/112,308, Response filed Jul. 20, 20 to Final Office Action dated Apr. 20, 2020", 8 pgs.

Debevec, Paul, "Rendering Synthetic Objects into Real Scenes: Bridging Tradition and Image-based Graphics with Global Illumination and High Dynamic Range Photography", ACM SIGGRAPH '98, 10 pgs.

Ikeuchi, Katsushi, et al., "Modeling from Reality", IEEE, Proceedings of the 3rd International Conference on 3-D Digital Imaging and Modeling, (2001), 117-124.

* cited by examiner

AUGMENTED REALITY SYSTEM USING STRUCTURED LIGHT

CLAIM OF PRIORITY

This application is a continuation of U.S. patent application Ser. No. 16/112,308, filed on Aug. 24, 2018, which is incorporated herein by reference in its entirety.

TECHNICAL FIELD

Embodiments of the present disclosure relate generally to mobile computing technology and, more particularly, but not by way of limitation, to systems for generating and presenting augmented reality media content.

BACKGROUND

Augmented reality refers to using computer generated enhancements to add new information into images in a real-time or near real-time fashion. For example, video images of a wall output on a display of a device may be enhanced with display details that are not present on the wall, but that are generated to appear as if they are on the wall by an augmented reality system. Such systems require a complex mix of image capture information that is integrated and matched with the augmented reality information that is to be added to a captured scene in a way that attempts to seamlessly present a final image from a perspective determined by the image capture device.

BRIEF DESCRIPTION OF THE SEVERAL VIEWS OF THE DRAWINGS

Various ones of the appended drawings merely illustrate example embodiments of the present disclosure and should not be considered as limiting its scope.

DETAILED DESCRIPTION

Figure 1A:
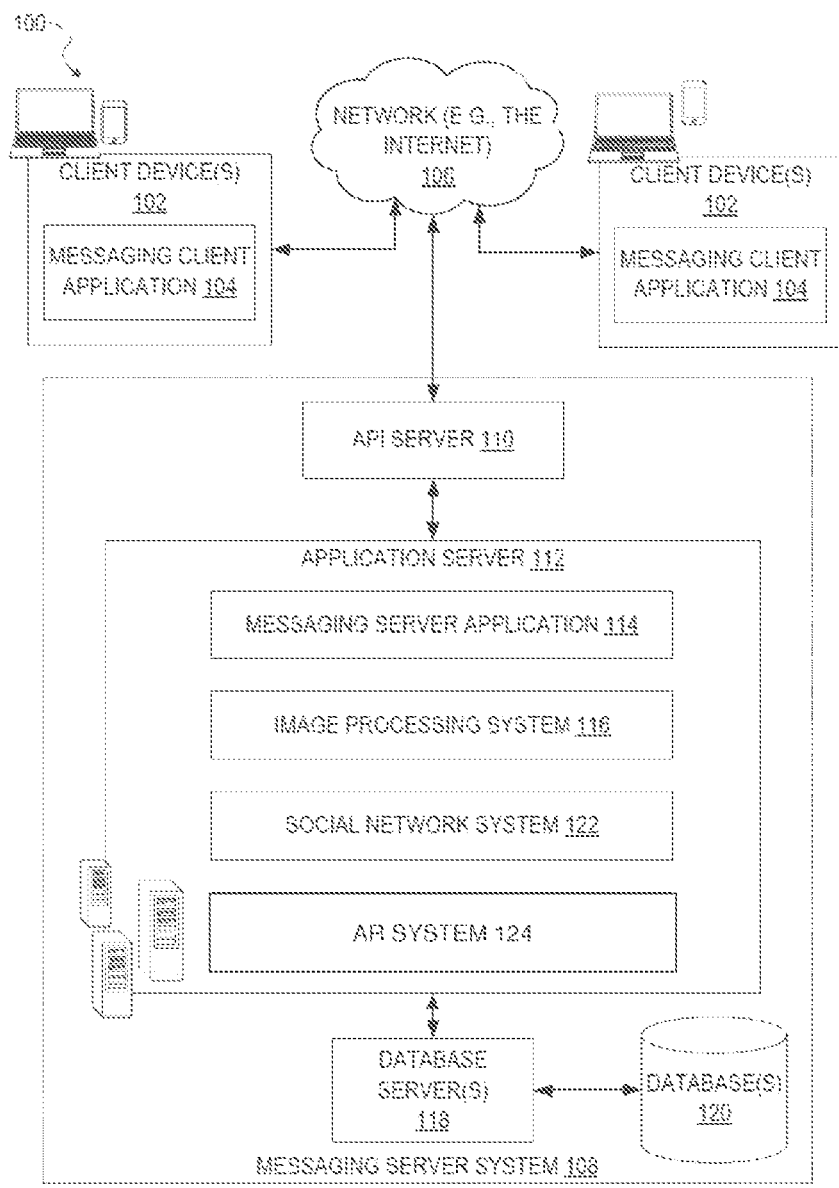
FIG. 1A is a block diagram for explaining an example messaging system for exchanging data (e.g., messages and associated content) over a network in accordance with some embodiments, wherein the messaging system includes an augmented reality system.

Embodiments of the present disclosure relate generally to mobile computing technology and, more particularly, but not by way of limitation, to systems for generating and presenting augmented reality media content. An Augmented Reality (AR) system as described herein may be or include any instrumentality or aggregate of instrumentalities operable to compute, process, store, display, generate, communicate, or apply various forms of data for generating and presenting interfaces for the display of AR media content.

In accordance with various embodiments described herein, an augmented reality (AR) system is provided on a mobile platform (e.g., a mobile phone, a tablet computer, etc.) In order for the AR system to place a virtual object in a scene in a geometrically accurate manner, it is desirable to obtain accurate information about the geometry of the scene (e.g., depth information). In one aspect described herein, such information is obtained using structured light.

In some embodiments, the AR system includes a light source and a camera. Generally, light source projects of a pattern of light onto a scene. The camera captures an image of the scene including the projected pattern. A projector pixel of the projected pattern is determined that corresponds to an image pixel of the captured image. A disparity of each correspondence is determined, the disparity being an amount that corresponding pixels are displaced between the projected pattern and the captured image. A three-dimensional computer model of the scene is generated based on the disparity and a virtual object is rendered in the scene based on the computer model.

In some embodiments, a distance between a location of the light source and a location of the camera is from 5 mm to 10 mm. In some embodiments, a distance between a location of the light source and a location of the camera is 20 mm.

In some embodiments, a size of a window for determining the disparity is greater than a greatest disparity that is estimated based on a target depth range of the scene, the greatest disparity being the largest amount that corresponding pixels are displaced between the projected pattern and the captured image.

In some embodiments, the projected pattern is periodic. In some embodiments, the period of the pattern is equal to the window size. In some embodiments, the projected pattern is a triangular pattern.

In some embodiments, the AR system also includes a mask having transparent areas and opaque areas, wherein the mask modulates an intensity of light from the light source.

In some embodiments, the AR system also includes a lens to project the pattern onto the scene.

In some embodiments, the light source is a light emitting diode (LED). In some embodiments, the light source is a laser.

In some embodiments, the computer model comprises a depth map. In some embodiments, the computer model comprises a video rate depth map.

In some embodiments, an image of the scene without the projected pattern is captured. A difference is determined between the image captured including the projected pattern and the image captured without the projected pattern. In some aspects, causing the camera to capture the image of the scene including the projected pattern, causing the camera to capture the image of the scene without the projected pattern, and determining the difference are performed at a frame rate equal to a frame rate of the camera to generate: (i) depth maps at half the frame rate of the camera and (ii) a video at half the frame rate of the camera, the video being free of the projected pattern.

By virtue of the embodiments described above, it is possible to provide an AR system that obtains depth information by capturing only one or two images, such that it is robust to motion artifacts (e.g., due to either motion of the mobile device or motion of the scene). In addition, it is possible to provide an AR system that allows for simple decoding, such that computational resources are not heavily burdened. Also, it is possible to provide an AR system having a small baseline (e.g., small footprint of the mobile device itself).

FIG. 1A is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104, While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an augmented reality (AR) system 124. The messaging server application 114 implements a number of message processing technologies and functions, particularly related to the aggregation and other processing of content (e.g., textual and multimedia content) included in messages received from multiple instances of the messaging client application 104, As will be described in further detail, the text and media content from multiple sources may be aggregated into collections of content (e.g., called stories or galleries), These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 1B:
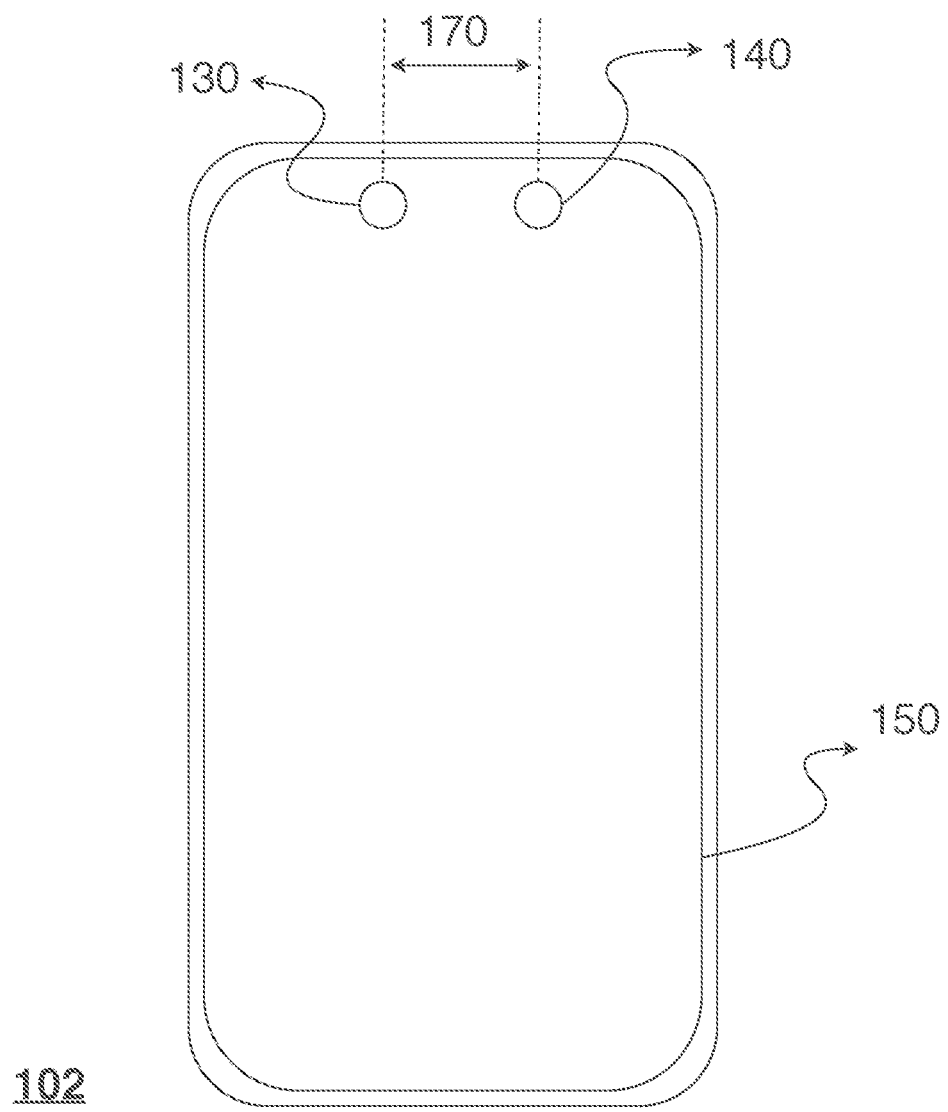
FIG. 1B illustrates one example for explaining a client device according to some embodiments.

FIG. 1B illustrates one example for explaining a client device 102 that is be used for an augmented reality system according to some embodiments. As shown in FIG. 1B, the client device 102 includes a light source 140 and a camera 130a. Generally, light source 140 projects a pattern of light onto a scene. The camera 130 captures an image of the scene including the projected pattern.

Light source 140 and camera 130 have a fixed geometrical relationship to each other. In some embodiments, a distance 170 between a location of the light source 140 and a location of the camera 130 is in a range between 5 mm to 10 mm. In some embodiments, the distance 170 between a location of the light source and a location of the camera is 20 min.

In some embodiments, a device display area 150 presents augmented reality images as described herein. Inputs and adjustments to any system operation described herein may be performed using touch screen inputs within device display area 150 by a user. Although the embodiment of FIG. 1B illustrates display area 150 on the same surface as camera 130 and light source 140, in other embodiments, the display area 150 is located on the opposite surface from camera 130 and light source 140.

FIG. 1B illustrates an example mobile device 102 executing a mobile operating system (e.g., IOS™, ANDROID™, WINDOWS® Phone, or other mobile operating systems), consistent with some embodiments. In one embodiment, the mobile device 102 includes a touch screen operable to receive tactile data from a user. For instance, the user may physically touch the mobile device 102, and in response to the touch, the mobile device 102 may determine tactile data such as touch location, touch force, or gesture motion. In various example embodiments, the mobile device 102 displays a home screen (e.g., Springboard on IOS™) operable to launch applications or otherwise manage various aspects of the mobile device 102. In some example embodiments, the home screen provides status information such as battery life, connectivity, or other hardware statuses. The user can activate user interface elements by touching an area occupied by a respective user interface element. In this manner, the user interacts with the applications of the mobile device 102. For example, touching the area occupied by a particular icon included in the home screen causes launching of an application corresponding to the particular icon.

Many varieties of applications (also referred to as "apps") can be executed on the mobile device 102, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 102 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 102 includes a social messaging app, consistent with some embodiments, that allows users to exchange ephemeral messages that include media content. In this example, the social messaging app can incorporate aspects of embodiments described herein.

Figure 2:
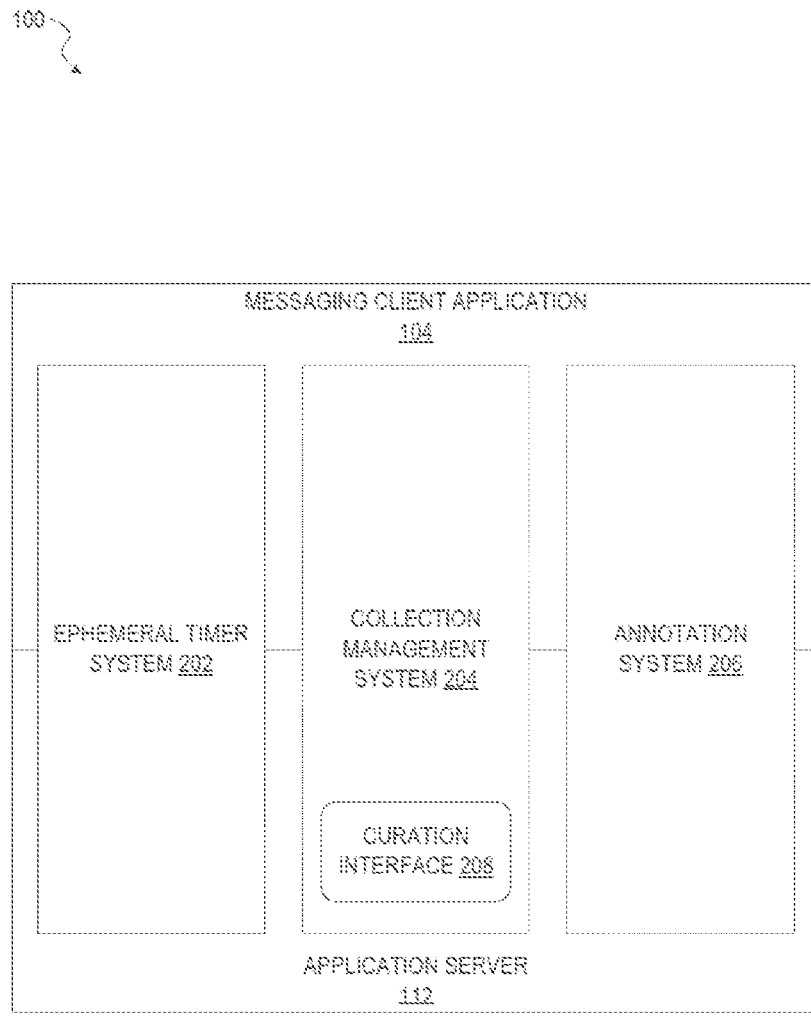
FIG. 2 is block diagram for explaining further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects.

Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
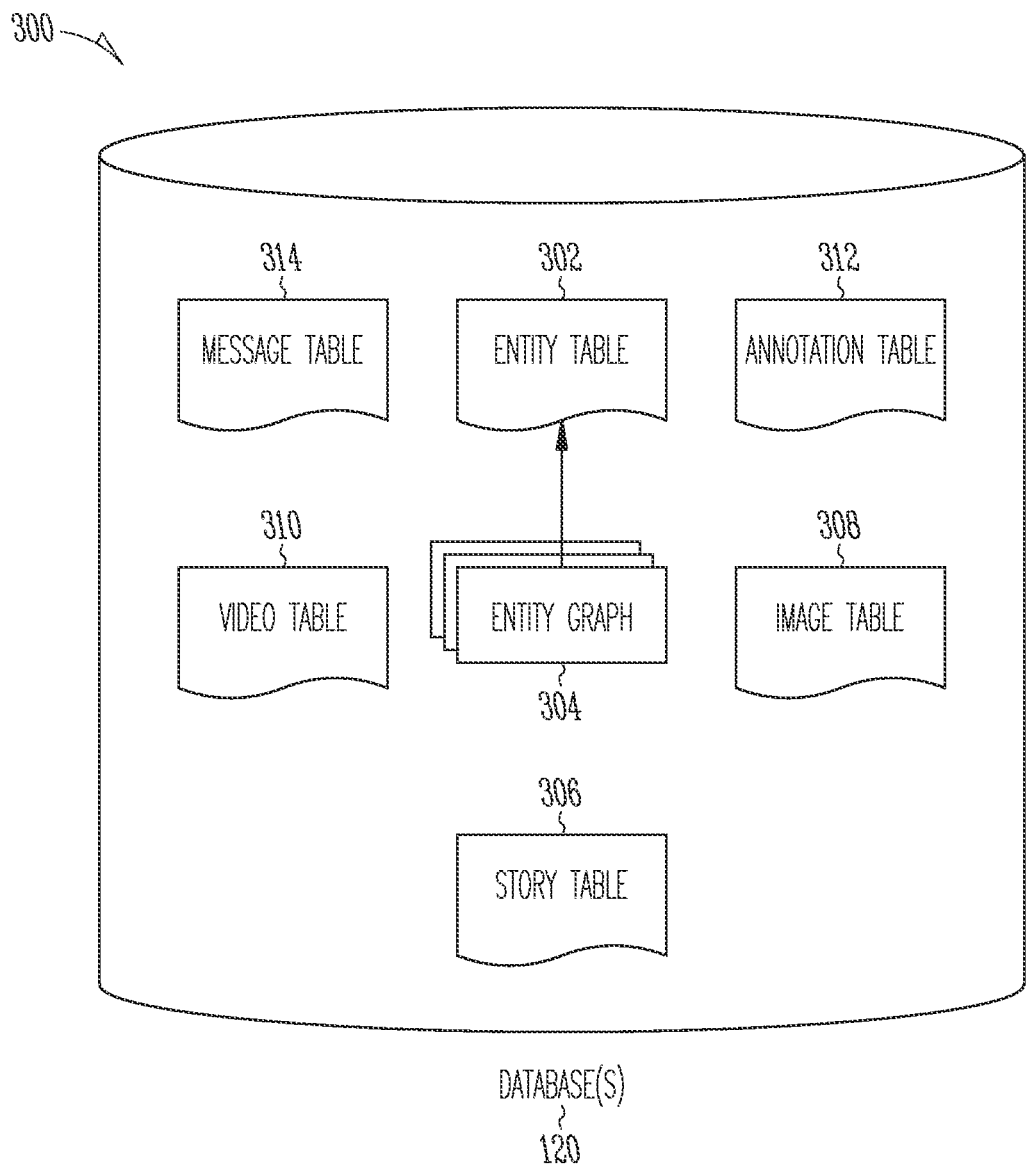
FIG. 3 is a schematic diagram for explaining data which may be stored in the database of the messaging server system, according to example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312, Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery) The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a created stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
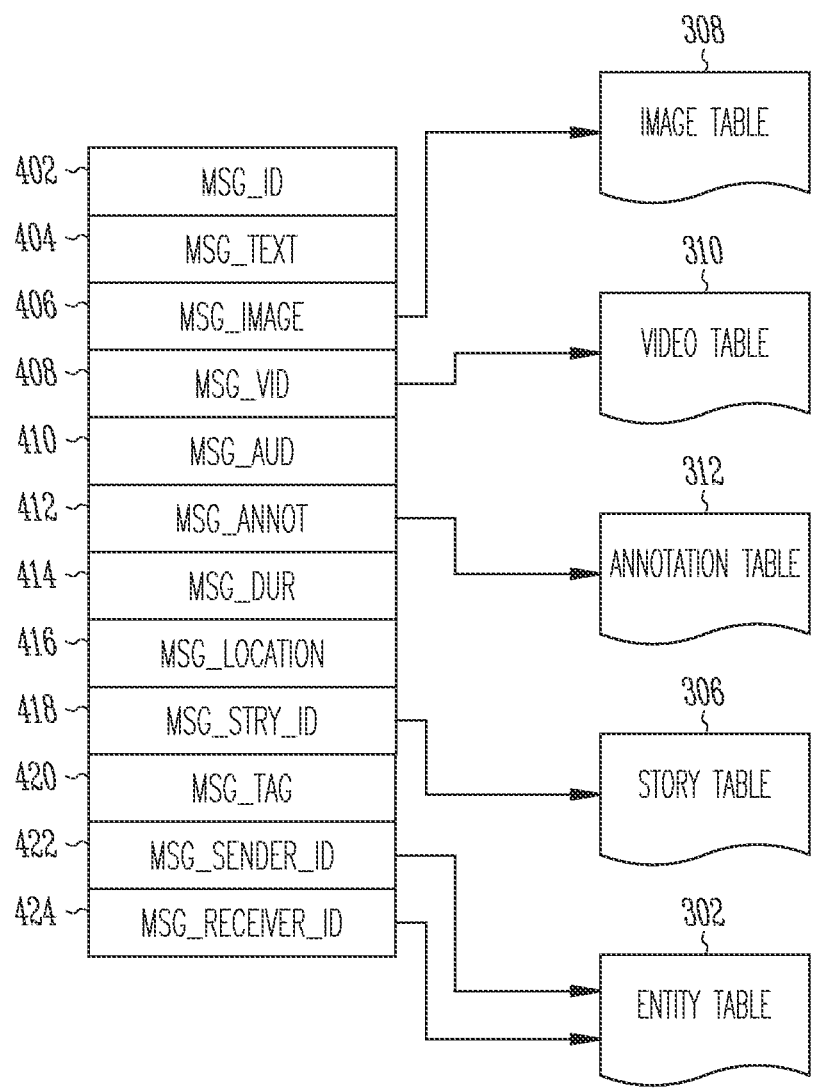
FIG. 4 is a schematic diagram for explaining a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload. 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104, A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
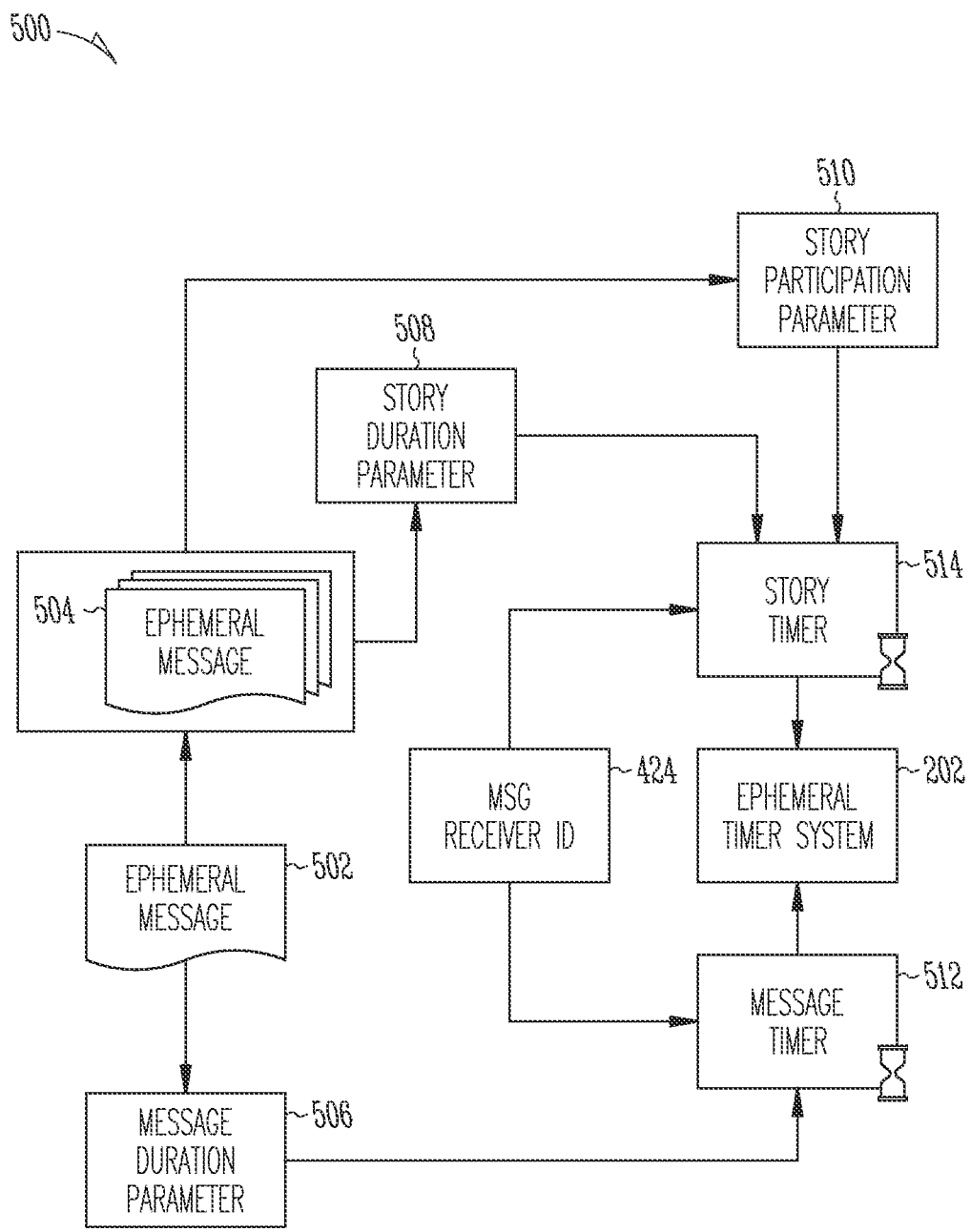
FIG. 5 is a schematic diagram for explaining an example access-limiting process, in terms of which access to content (e.g., an ephemeral message, and associated multimedia payload of data) or a content collection (e.g., an ephemeral message story) may be time-limited (e.g., made ephemeral) in accordance with some embodiments.

FIG. 5 is a schematic diagram illustrating an access-limiting process 500, in terms of which access to content e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g. an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504, Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated stow participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
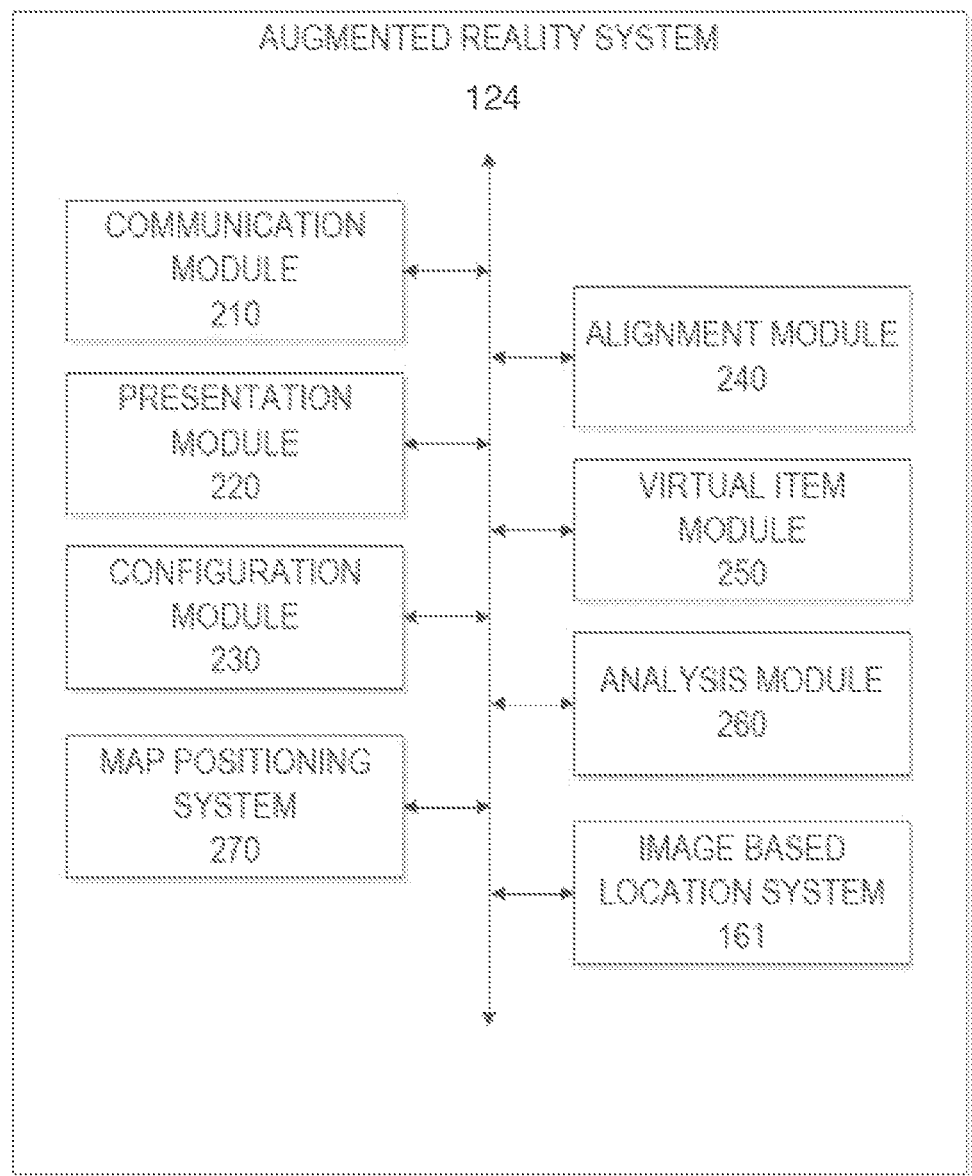
FIG. 6 is a block diagram for explaining various modules of an augmented reality system, according to example embodiments.

FIG. 6 is a block diagram illustrating example components of the AR system 124 according to some embodiments. The augmented reality system 160 is shown to include an image-based location system 161, a communication module 210, a presentation module 220, a configuration module 230, an alignment module 240, a virtual item module 250, an analysis module 260, and a map positioning system 270. All, or some, of the modules 210-270 communicate with each other, for example, via a network coupling, shared memory, and the like. Each module of the modules of augmented reality system 160 can be implemented as a single module, combined into other modules, or further subdivided into multiple modules. Other modules not pertinent to example embodiments can also be included, but are not shown.

The communication module 210 provides various communication functionality. For example, the communication module 210 receives, accesses, or otherwise obtains image data of an image from a user device. In a specific example, the communication module 210 receives substantially real-time image data from a camera sensor of a smart phone (e.g., a single frame of image data or a continuous stream of frames captured by a camera sensor of the smart phone). The communication module 210 exchanges network communications with the database servers 132, the client devices 110, and the third party servers 120. The information retrieved by the communication module 210 includes data associated with the user (e.g., member profile data from an online account or social network service data) or other data to facilitate the functionality described herein.

The presentation module 220 provides various presentation and user interface functionality operable to interactively present and receive information to and from the user. For instance, the presentation module 220 is used to manage output of image data with aligned and inserted virtual objects, so that augmented reality images may be presented on a display. As mentioned above, these images may be presented in real-time or near real-time as the images are captured, processed to add virtual objects, and displayed with the virtual objects as quickly as possible. Presentation module 220 is also utilizable to present user interfaces, AR objects, or any such information generated in response to decoding an optical barcode such as optical barcode 806 discussed below. In various embodiments, the presentation module 220 presents or causes presentation of additional information (e.g., visually displaying information on a screen, acoustic output, haptic feedback). The process of interactively presenting information is intended to include the exchange of information between a particular device and the user. The user may provide input to interact with the user interface in many possible manners, such as alphanumeric, point based (e.g., cursor), tactile, or other input (e.g., touch screen, tactile sensor, light sensor, infrared sensor, biometric sensor, microphone, gyroscope, accelerometer, or other sensors). The presentation module 220 provides many other user interfaces to facilitate functionality described herein. The term "presenting" as used herein is intended to include communicating information or instructions to a particular device that is operable to perform presentation based on the communicated information or instructions. This may include both output on a screen as well as projection of an image onto a user's eye.

The configuration module 230 may be used to accept and manage user selection of system options. This may include options to select various augmented reality selections, including enabling augmented reality and requesting certain types of augmented reality information to be provided or triggered based on user inputs or input based triggers. For example, configuration module 230 may include a setting provided by a user to automatically present information about certain types of locations when the locations are identified in an image based location system or a map positioning system. Configuration module 230 may also accept user settings to automatically provide direction information in an augmented reality image when direction input triggers are received via communication module 210. In other embodiments, any other triggers for implementing image based location or augmented reality images may be managed by configuration module 230. For example, the configuration module 230 extracts and analyzes candidate shape features or candidate contour characteristics from image data of the image received from the user device (e.g., the client devices 110) when a system includes such analysis as a trigger for display of augmented reality images. The configuration module 230 determines satisfaction of various rules or criteria associated with the extracted candidate shape features. The configuration module 230 compares the extracted candidate shape features with reference shape features of the custom graphic or another reference image. The configuration module 230 can employ a wide variety of schemes and techniques to extract candidate shape features from the image data of the image and subsequently trigger display of augmented reality images.

The alignment module 240 provides image processing functionality to determine and verify an alignment of the image data captured by an image sensor and the virtual objects placed into the image. In some embodiments, alignment module 240 may access or generate a computer model of the environment, and may use the computer model to insert virtual items into an image based on the computer model of the environment. In some embodiments, alignment module 240 calculate the scene's depth and surface information. In some embodiments, the computer is a digital three dimensional (3D) representation in the form of a 3D scan.

In some embodiments, alignment module 240 may perform threshold or rule checks to verify that virtual items displayed in augmented reality images meet certain quality metrics to provide an acceptable user experience. This may include verifying that a virtual object does not move in unexpected ways with respect to objects in an image, that images captured by an image sensor are sufficiently stable over time to enable augmented reality functions, or other such metrics. In some embodiments, the alignment module 240 extracts spatial attributes from the image data. In various embodiments, the spatial attributes include at least one of position, orientation, scale, or other spatial aspects of objects in images. The alignment module 240 determines an alignment of the image objects based on the spatial attributes (e.g., a particular orientation). In an example, the alignment module 240 can determine an alignment including position and orientation based on the spatial attributes and generate a transformed image according to the alignment.

The virtual item module 250 provides functionality to generate images associated with virtual items. In some embodiments, this may include graphics information related to virtual location markers, virtual direction arrows, or virtual items or objects. In some embodiments, this may include graphics information for inserting mobile virtual objects into video (e.g., virtual animals, robots, dinosaurs, video display, etc.). In some embodiments, for each virtual object, presentation rules may be stored in virtual item module 250 and used by other modules to verify that virtual objects may be inserted into image data with sufficient output quality.

The analysis module 260 provides functionality to perform a variety of image processing operations. Such operations may include image processing operations to identify key points in an image and to match two-dimensional façade data against portions of an image to identify a match. For example, in some embodiments, analysis module 260 may accept an image and identify building corners or other key points in the image that may contain two-dimensional pattern data as part of a façade. Analysis module 260 may then take façade data from a model and match the portion of the image to a building façade model included in the façade data. In some embodiments, if no match is found, an analysis module 260 operating on a client device 110 may request additional information or additional processing by an analysis module 260 operating on a remote server, such as a third party server 120 or a server that is part of a social messaging system 130.

The map positioning system 270 provides map data including associations between map locations and façade data associated with buildings in a location, or any other such information in a system. Map positioning system 270 may also interface with remote servers or systems, which may provide this information.

Image based location system 161 may comprise modules to accept street view images from any number of sources and analyze the images to generate façade data. Such façade data may include two-dimensional estimates of certain patterns on a building, as well as key point information for simple building locations, such as the locations of building corners or corners of two-dimensional façade patterns on a building. In some embodiments, information from multiple images may be used to generate façade data for a single building. Such information from multiple images may be used to match colors in different lighting situations, or to match minor changes over time to a building façade. In some embodiments, specialized image and location capture equipment may be used to generate information about building locations, keypoints of buildings, and building façade data with high accuracy in order to build a database of outdoor images of buildings in order to provide accurate references for image based location systems. Capturing locations of building corners, for example, with high accuracy (e.g., accuracy on the order of single digit centimeters or millimeters) provides a basis for an image based location estimate for a camera position with similar errors. In some embodiments, determining a camera position within a few centimeters (e.g., 5 cm) is sufficient to provide augmented reality presentation with a low chance of clear errors in the output images that break the reality illusion of augmented reality images.

In some embodiments, image based location system 161 may be distributed over a local client device and a remote server, with low information façade models (e.g., models with low-resolution and/or low color two-dimensional façade data and a small number of keypoints) stored locally on a device for regularly visited locations, expected future travel locations, or for buildings which the system believes might be near a device in the future. High information models (e.g., high resolution, high color information, and/or high numbers of three-dimensional keypoints) may be stored remotely and used when local compact façade models fail. Image based location system 161 may, manage application of façade data and models to match portions of captured images using analysis module 260. Once a match is found using analysis module 260, location information related to a building matching façade data or keypoints in a building may be used to calculate a relative position of the camera perspective in a captured image. This relative position may be used to determine an absolute position based on the position of building keypoints or other absolute position information that is part of a façade or other model for a building associated with façade data.

Any one or more of the modules described may be implemented using hardware alone (e.g., one or more of the processors 1204 of a machine) or a combination of hardware and software. For example, any module described of the AR system 124 may physically include an arrangement of one or more of the processors 1204 (e.g., a subset of or among the one or more processors of the machine) configured to perform the operations described herein for that module. As another example, any module of the AR system 124 may include software, hardware, or both, that configure an arrangement of one or more processors 1204 (e.g., among the one or more processors of the machine) to perform the operations described herein for that module. Accordingly, different modules of the AR system 124 may include and configure different arrangements of such processors 1204 or a single arrangement of such processors 1204 at different points in time. Moreover, any two or more modules of the AR system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 7:
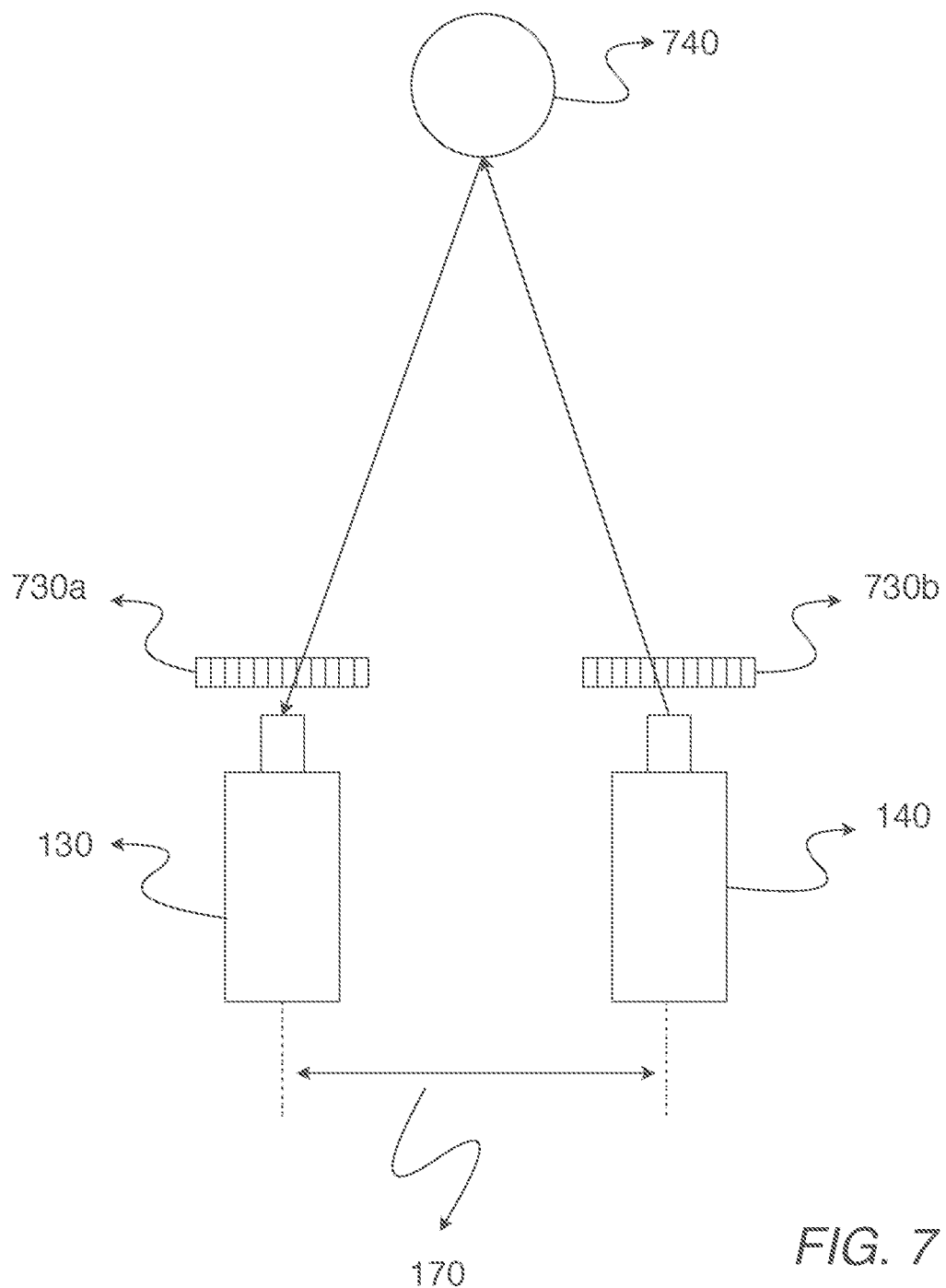
FIG. 7 is a schematic diagram for explaining an example augmented reality system according to some example embodiments.

FIG. 7 is a schematic diagram for explaining an example augmented reality system according to some example embodiments. As shown in FIG. 7, light source 140 projects of a pattern of light onto a scene 740. In some embodiments, the light source 140 is a projector. In some embodiments, the light source 140 is a light emitting diode (LED). In some embodiments, the AR system also includes a mask including transparent areas and opaque areas, the mask modulating an intensity of light from the light source to project the pattern onto the scene 740, and an optical lens that projects light from light source 140 onto the scene 740 (e.g., 730a, 730b). The camera 130 captures an image of the scene including the projected pattern.

As previously discussed, light source 140 and camera 130 have a fixed geometrical relationship to each other. In some embodiments, a distance 170 between a location of the light source 140 and a location of the camera 130 is between 5 mm to 10 mm. In some embodiments, a distance 170 between location of the light source 140 and a location of the camera 130 is 5 mm to 50 nm. In some embodiments, the distance 170 between a location of the light source and a location of the camera is 20 mm.

A projector pixel of the pattern projected by light source 140 is determined that corresponds to an image pixel of the image captured by camera 130. A disparity of each correspondence is determined, the disparity being an amount that corresponding pixels are displaced between the projected pattern and the captured image.

Disparity is captured by following equation.

$$i(x,y)=\rho(x,y)p(x+u(x,y),y) \quad \text{(equation 1)}$$

In equation 1, P(x, y) represents the projected pattern; ρ(x, y) represents a scaling (albedo) factor representing texture of the scene; u(x, y) represents the disparity. The geometry of the scene (e.g., depth of the scene) is estimated based on the disparity u(x, y).

Assuming the disparity is small, a first order approximation is performed:

$$I(x,y)=\rho(x,y)P(x,y)+U(x,y)P_x(x,y) \quad \text{(equation 2)}$$

$$U(x,y)=\rho(x,y)u(x,y) \quad \text{(equation 3)}$$

In equations 2 and 3, I(x, y) represents the image captured by the camera 130; ρ(x, y) represents texture of the scene (albedo factor); P(x, y) represents the pattern projected onto the scene by light source 140; $P_x$ (x, y) represents the derivative of the projected pattern along the horizontal direction; u(x, y) represents the disparity; U(x, y) is the product of the albedo factor multiplied by the disparity.

Assuming over a small n×n window that the albedo factor ρ(x, y) is constant and the disparity u(x, y) is constant, the following matrix is generated.

$$\begin{bmatrix} P_x(x_1,y_1)P(x_1,y_1) \\ P_x(x_k,y_l)P(x_k,y_l) \\ \vdots \\ P_x(x_n,y_n)P(x_n,y_n) \end{bmatrix} \begin{bmatrix} u_0 \\ \rho_0 \end{bmatrix} = \begin{bmatrix} I(x_1,y_1) \\ I(x_k,y_l) \\ I(x_n,y_n) \end{bmatrix} \quad \text{(equation 4)}$$

$$A = \begin{bmatrix} P_x(x_1,y_1)P(x_1,y_1) \\ P_x(x_k,y_l)P(x_k,y_l) \\ \vdots \\ P_x(x_n,y_n)P(x_n,y_n) \end{bmatrix} \quad \text{(equation 5)}$$

$$u = \begin{bmatrix} u_0 \\ \rho_0 \end{bmatrix} \quad \text{(equation 6)}$$

$$I_c = \begin{bmatrix} I(x_1,y_1) \\ I(x_k,y_l) \\ I(x_n,y_n) \end{bmatrix} \quad \text{(equation 7)}$$

In equations 4 to 6, Ic represents the camera observations (e.g., a collection of intensities of the camera 130); matrix A is formed by intensities of the light source 140; the first column of matrix A represents the derivative of the projector intensities; the second column of matrix A represents the values of the projected pattern itself; the matrix u is to be estimated.

In order to determine a pattern to project, the following equation is examined:

$$Au=I_c \quad \text{(equation 8)}$$

Both sides of equation 8 are multiplied by the transpose of matrix A:

$$A^TAu=A^TI_c \quad \text{(equation 9)}$$

Resulting in the following micro-baseline structured light (MSL) matrix:

$$\begin{bmatrix} \langle I_p^x, I_p^x \rangle & \langle I_p, I_p^x \rangle \\ \langle I_p, I_p^x \rangle & \langle I_p, I_p \rangle \end{bmatrix} \begin{pmatrix} u_0 \\ \rho_0 \end{pmatrix} = \begin{pmatrix} \langle I_p, I_c \rangle \\ \langle I_p^x, I_c \rangle \end{pmatrix} \quad \text{(equation 10)}$$

In equation 10, $\langle I_p, I_c \rangle$ represents the inner product between camera intensities Ic and projector intensities Ip; $\langle I_p^x, I_c \rangle$ represents the inner product between camera intensities k and the derivative of the projector intensities $I_p^x$.

One advantage of the MSL matrix of equation 10 is that it depends solely on the pattern projected onto the scene. In order to determine a pattern such that the MSL matrix is inverted, a condition number is minimized. For example, the cross-diagonal limits of the MSL matrix are minimized, such that a variance in solution (ambiguity) is lowered. An variance in solution is, for example, a scene depth that is indicated as a couple of inches or a couple of hundred inches away. In the MSL matrix, the cross-diagonal limits are the two terms: $\langle I_p, I_p^x \rangle$; $\langle I_p, I_p^x \rangle$.

The following conditions are imposed:

(1) The projected pattern is periodic (e.g., sinusoids, piecewise linear) with period equal to the window size (n). This provides a solution that has low variance; and (2) $P(x_1, y) = P(x_n, y)$.

Now, invariance to tilted planes in the scene (e.g., tables, walls, chairs) will be considered. In the foregoing, disparity has been assumed to be constant over a small n×n window. That condition is now relaxed, and it is assumed that disparity is linearly varying over the small n×n window:

$$u = ax + b \quad \text{(equation 11)}$$

This provide that the estimated disparity is approximately equal to the original disparity, and this estimate is invariant to the tilt of the plane:

$$u_0 = \text{mean}(u) \quad \text{(equation 12)}$$

The invariance to tilted planes is provided for if the derivative is +/− constant ($l_x(x, y) = \pm \text{constant}$) The projected patterns are therefore determined to be piecewise linear.

Figure 8:
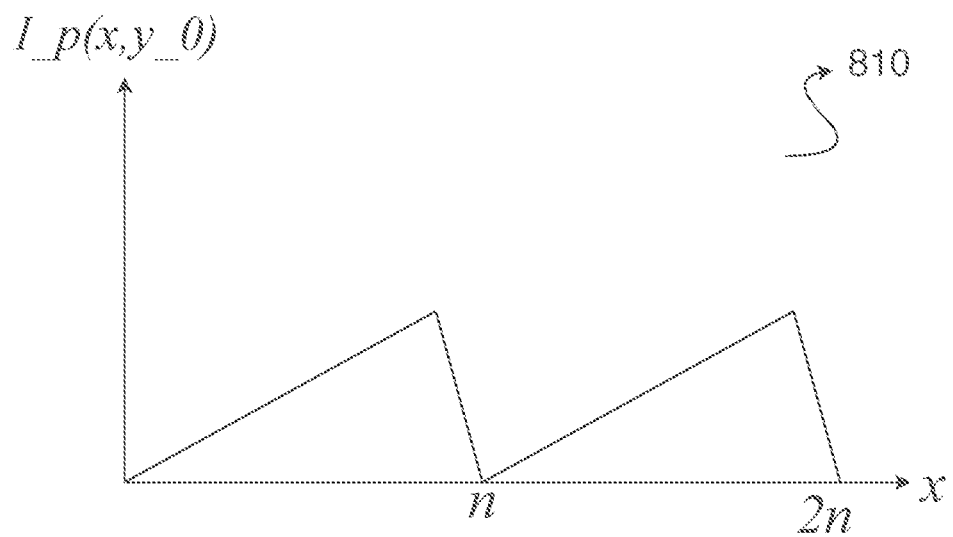
FIG. 8 is a graphical representation for explaining example projected patterns according to some example embodiments.
Figure 8:
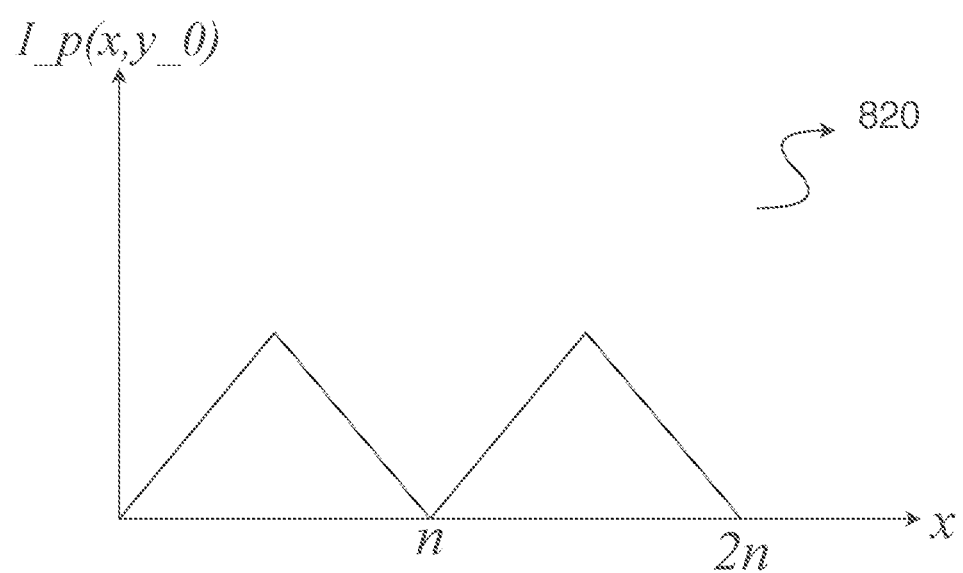

In order to maximize the signal to noise ratio (SNR, the diagonal limits of the MSL matrix $\langle I_p, I_p^x \rangle$ and $\langle I_p, I_p \rangle$ are maximized. It is therefore determined that the projected pattern should be a triangular pattern, such as the pattern 820 illustrated in FIG. 8. The pattern 820 can have a window size of n or 2n.

Figure 9:
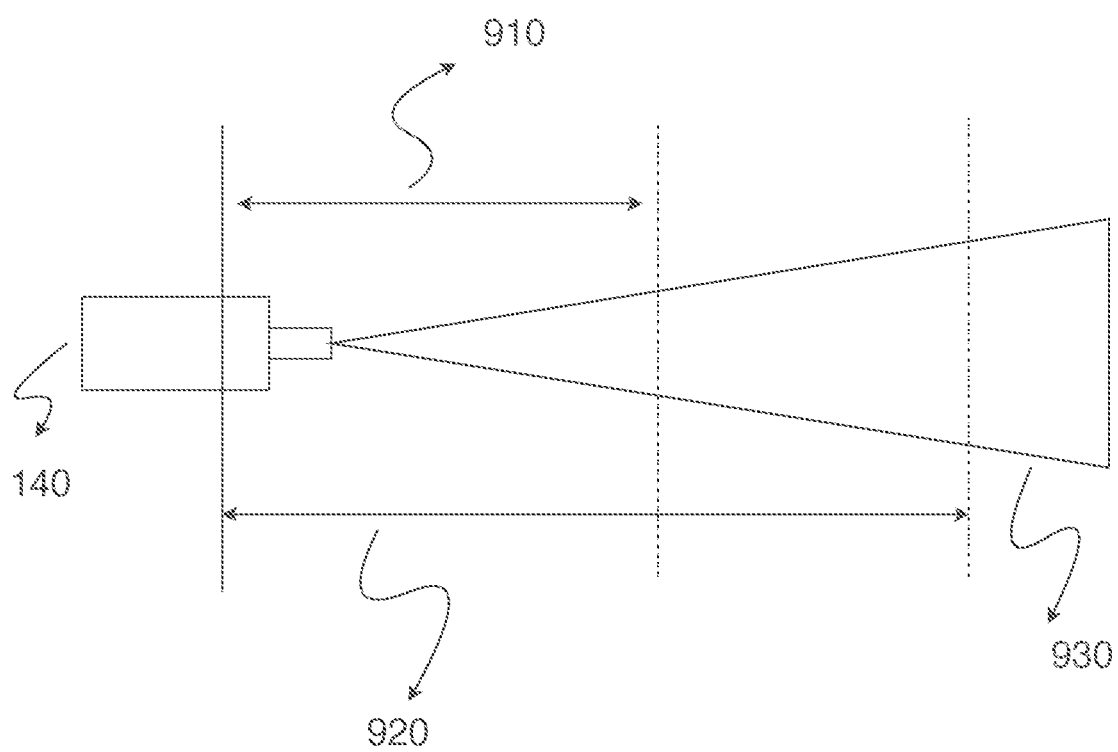
FIG. 9 is a schematic diagram for explaining window size according to some example embodiments.

Selection of the window size is now discussed with reference to FIG. 9. As illustrated in FIG. 9, a light source 140 projects a pattern of light 930. The appropriate window size is determined based on the target range of depths (e.g., 910, 920) of the scene. In the context of a mobile device, this is, for example, approximately more than 2 feet away from the camera and approximately less than 10 feet away from the camera. In some embodiments, the window size n is selected to be greater than a greatest disparity that is estimated based on a target depth range of the scene (n≥u_max). The greatest disparity is the largest amount that corresponding pixels are displaced between the projected pattern and the captured image. In some embodiments, the window size can be a factor of n (kn).

In embodiments where a scene is highly textured, window size is adjusted and adapted to the scene (e.g., the window size is not fixed). For example, the window size can be made larger to encompass a highly textured area of the scene. In such embodiments, a constant disparity can be assigned for an entire area having similar characteristics.

Figure 10:
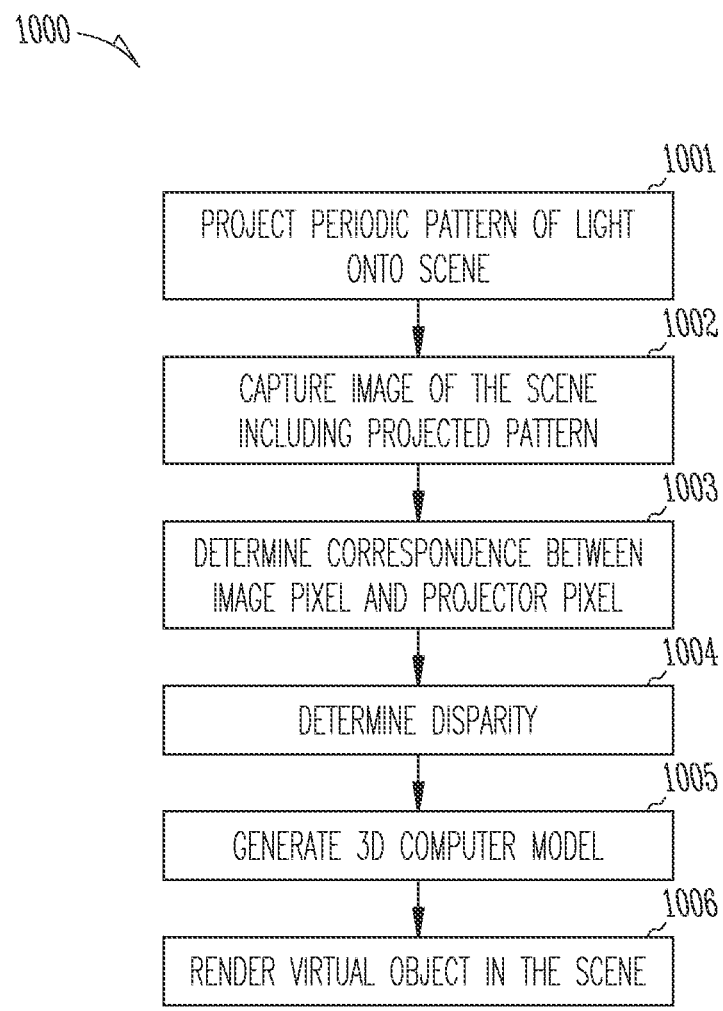
FIG. 10 is a flow chart for explaining a method of projecting structured light to recover three-dimensional data according to some example embodiments.

FIG. 10 is a flow chart for explaining a method of projecting structured light to recover three-dimensional data according to some example embodiments. Operations of the method 1000 may be performed by the modules described above with respect to FIG. 6, As shown in FIG. 10, the method 1000 includes one or more blocks 1001, 1002, 1003, 1004, 1005 and 1006.

At block 1001, the light source projects a pattern of light onto a scene. In some embodiments, the pattern is periodic. The period of the pattern is equal to the window size for determining disparity. In some embodiments, the projected pattern is a triangular pattern.

At block 1002, the camera captures an image of the scene including the projected pattern.

At block 1003, a correspondence is determined between an image pixel of the captured image and a projector pixel of the projected pattern.

At block 1004, a disparity of each correspondence is determined. The disparity is an amount that corresponding pixels are displaced between the projected pattern and the captured image.

The window size of a window for determining the disparity is greater than a greatest disparity that is estimated based on a target depth range of the scene. The greatest disparity is the largest amount that corresponding pixels are displaced between the projected pattern and the captured image.

At block 1005, one or more processors generates a three-dimensional computer model of the scene based on the disparity.

At block 1006, a virtual object is rendered in the scene based on the three-dimensional computer model. In some embodiments, the computer model comprises a depth map. In some embodiments, the computer model comprises a video rate depth map.

By virtue of the method described above, even with a small footprint (small distance between the camera and light source) it is possible to use structured light to obtain depth information about a scene. In addition, it is possible to do so computationally quickly.

Figure 11:
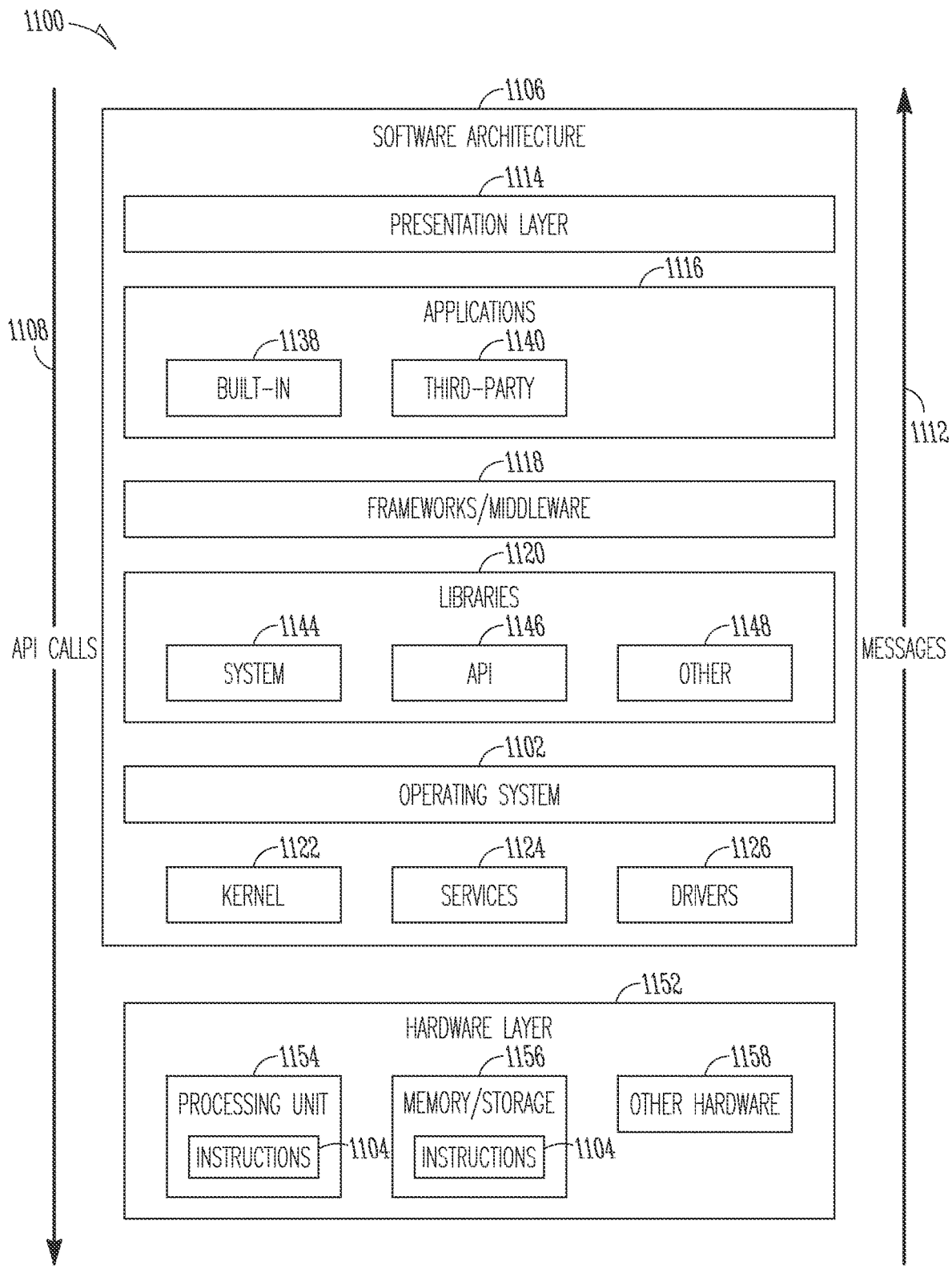
FIG. 11 is a block diagram for explaining a representative software architecture, which may be used in conjunction with various hardware architectures herein described and used to implement various embodiments.

In some embodiments, in order to compensate for ambient light in the scene (e.g., separate ambient light from the captured image), the AR system also causes the camera to capture an image of the scene without the projected pattern. A difference is determined between the image captured including the projected pattern and the image captured without, the projected pattern to obtain an image of the scene including the projected pattern but without ambient light. In some embodiments, capturing the image of the scene including the projected pattern, capturing the image of the scene without the projected pattern, and determining the difference are performed at a frame rate equal to a frame rate of the camera (e.g., 60 fps), This allows for generation of depth maps at half the frame rate of the camera (e.g. 30 fps) and a pattern free video at half the frame rate of the camera (e.g. 30 fps), the pattern free video being free of the projected pattern. In some embodiments, a video rate depth map is provided comprising a depth map that is at video rate, Software Architecture FIG. 11 is a block diagram illustrating an example software architecture 1106, which may be used in conjunction with various hardware architectures herein described, FIG. 11 is a non-limiting example of a software architecture and it will be appreciated that many other architectures may be implemented to facilitate the functionality described herein. The software architecture 1106 may execute on hardware such as machine 700 of FIG. 11 that includes, among other things, processors 1104, memory 1114, and I/O components 1118. A representative hardware layer 1152 is illustrated and can represent, for example, the machine 1100 of FIG. 11. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104, The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Figure 12:
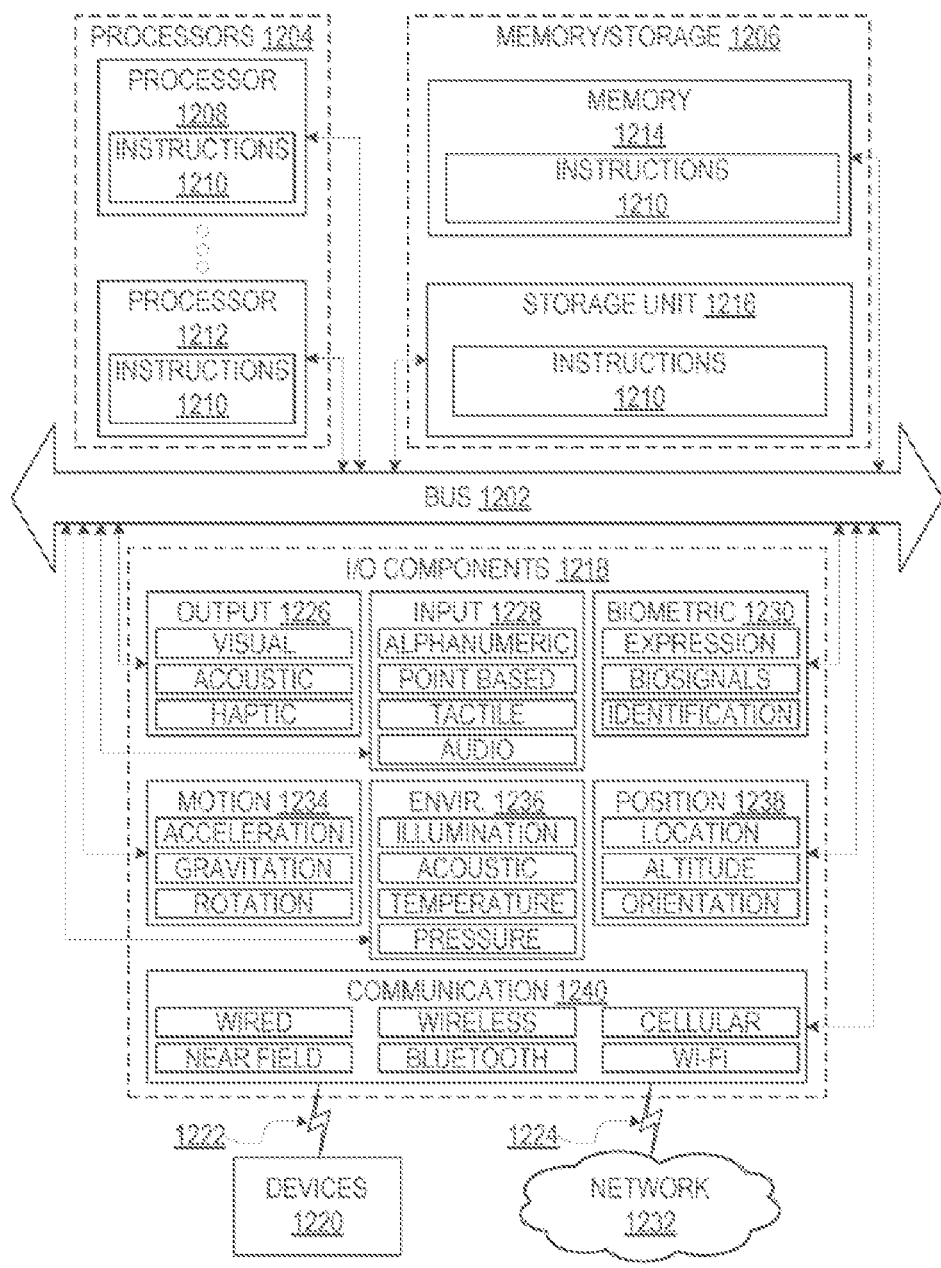
FIG. 12 is a block diagram for explaining components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein, Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory storage 1206, and I/O components 1218, which may be configured to communicate with each other such as via a bus 1202. The memory/storage 1206 may include a memory 1214, such as a main memory, or other memory, storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228, The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically, constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with the figures above are implemented in some embodiments in the context of a machine and an associated software architecture. The sections below describe representative software architecture(s) 0 and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (ENDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a. "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only, residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals "commands", "op codes", "machine code", etc.) and which produces corresponding output signals that are applied to operate a machine. A processor may, for example, be a Central Processing Unit ((PU), a Reduced Instruction Set Computing (RISC) processor, a Complex Instruction Set Computing (CISC) processor, a Graphics Processing Unit (GPU), a Digital Signal Processor (DSP), an Application Specific integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

What is claimed is:

1. A system comprising:
a light source;
a camera;
a memory; and
at least one hardware processor coupled to the memory and comprising instructions that causes the system to perform operations comprising:
causing the light source to project of a pattern of light onto a scene, wherein the pattern is periodic;
causing the camera to capture an image of the scene including the projected pattern;
determining a projector pixel of the projected pattern corresponding to an image pixel of the captured image;
determining a disparity of each correspondence, the disparity being an amount that corresponding pixels are displaced between the projected pattern and the captured image;
generating, by one or more processors, a three-dimensional computer model of the scene based on the disparity;
causing the camera to capture an image of the scene without the projected pattern;
determining a difference between the image captured including the projected pattern and the image captured without the projected pattern; and
rendering a virtual object in the scene based on the three-dimensional computer model and on the determined difference,
wherein a window size of a window for determining the disparity is adjustable, to encompass an area of the scene having predefined texture characteristics and to assign constant disparity to the area.

2. The system of claim 1, wherein a distance between a location of the light source and a location of the camera is from 5 mm to 10 mm.

3. The system of claim 1, wherein the window size of the window for determining the disparity is greater than a greatest disparity that is estimated based on a target depth range of the scene, the greatest disparity being a largest amount that corresponding pixels are displaced between the projected pattern and the captured image.

4. The system of claim 3, wherein the period of the pattern is equal to the window size.

5. The system of claim 1, wherein the projected pattern is a triangular pattern.

6. The system of claim 1, further comprising:
a mask including transparent areas and opaque areas, wherein the mask modulates an intensity of light from the light source; and
a lens to project the pattern onto the scene.

7. The system of claim 1, wherein the light source is a light emitting diode (LED).

8. The system of claim 1, wherein the computer model comprises a depth map.

9. The system of claim 1, wherein the computer model comprises a video rate depth map.

10. The system of claim 1, wherein causing the camera to capture the image of the scene including the projected pattern, causing the camera to capture the image of the scene without the projected pattern, and determining the difference are performed at a frame rate equal to a frame rate of the camera to generate depth maps at half the frame rate of the camera and to generate a video at half the frame rate of the camera, the video being free of the projected pattern.

11. A method comprising:
causing a light source to project of a pattern of light onto a scene, wherein the pattern is periodic;
causing a camera to capture an image of the scene including the projected pattern;

determining a projector pixel of the projected pattern corresponding to an image pixel of the captured image;

determining a disparity of each correspondence, the disparity being an amount that corresponding pixels are displaced between the projected pattern and the captured image;

generating a three-dimensional computer model of the scene based on the disparity;

causing the camera to capture an image of the scene without the projected pattern;

determining a difference between the image captured including the projected pattern and the image captured without the projected pattern; and rendering a virtual object in the scene based on the three-dimensional computer model and on the determined difference, wherein a window size of a window for determining the disparity is adjustable, to encompass an area of the scene having predefined texture characteristics and to assign constant disparity to the area.

12. The method of claim 11, wherein a distance between a location of the light source and a location of the camera is from 5 mm to 10 mm.

13. The method of claim 11, wherein the window size of the window for determining the disparity is greater than a greatest disparity that is estimated based on a target depth range of the scene, the greatest disparity being a largest amount that corresponding pixels are displaced between the projected pattern and the captured image.

14. The method of claim 13, wherein the period of the pattern is equal to the window size.

15. The method of claim 11, wherein the projected pattern is a triangular pattern.

16. The method of claim 11, further comprising:

modulating an intensity of light from the light source using a mask including transparent areas and opaque areas and a lens to project the pattern onto the scene.

17. The method of claim 11, wherein the light source is a light emitting diode (LED).

18. The method of claim 11, wherein the computer model comprises a depth map.

19. The method of claim 11, wherein the computer model comprises a video rate depth map.

20. A non-transitory computer-readable medium storing instructions that, when executed by a computer system, cause the computer system to perform operations comprising:

causing a light source to project of a pattern of light onto a scene, wherein the pattern is periodic;

causing a camera to capture an image of the scene including the projected pattern;

determining a projector pixel of the projected pattern corresponding to an image pixel of the captured image;

determining a disparity of each correspondence, the disparity being an amount that corresponding pixels are displaced between the projected pattern and the captured image;

generating a three-dimensional computer model of the scene based on the disparity;

causing the camera to capture an image of the scene without the projected pattern;

determining a difference between the image captured including the projected pattern and the image captured without the projected pattern, to obtain an image of the scene including the projected pattern without ambient light; and rendering a virtual object in the scene based on the three-dimensional computer model and on the determined difference, wherein a window size of a window for determining the disparity is adjustable, to encompass an area of the scene having predefined texture characteristics and to assign constant disparity to the area.

* * * * *